(12) United States Patent
Bernier et al.

(10) Patent No.: US 6,187,206 B1
(45) Date of Patent: Feb. 13, 2001

(54) THERMAL PLASMA REACTOR AND WASTEWATER TREATMENT METHOD

(75) Inventors: Jean Luc Bernier, Jonquière; Luc Fortin, Ste-Foy; Frank M. Kimmerle, Jonquière; Maher I. Boulos, Sherbrooke; Vijay Kasireddy, Jonquière; Gervais Soucy, St. Elie d'Orford, all of (CA)

(73) Assignee: Alcan International, Montreal (CA)

(*) Notice: Under 35 U.S.C. 154(b), the term of this patent shall be extended for 0 days.

(21) Appl. No.: 09/091,589

(22) PCT Filed: Dec. 20, 1996

(86) PCT No.: PCT/CA96/00865

§ 371 Date: Mar. 24, 1999

§ 102(e) Date: Mar. 24, 1999

(87) PCT Pub. No.: WO97/22556

PCT Pub. Date: Jun. 26, 1997

Related U.S. Application Data

(63) Continuation-in-part of application No. 08/575,630, filed on Dec. 20, 1995, now abandoned.

(51) Int. Cl.[7] .................................................. C02F 1/32

(52) U.S. Cl. .................... 210/721; 159/47.3; 210/737; 210/748; 210/758; 210/761; 210/769; 210/180; 210/192; 210/205; 422/184.1; 422/227; 422/906; 423/130; 588/210; 588/219; 588/227; 588/237

(58) Field of Search ................................. 210/721, 737, 210/748, 758, 761, 766, 769, 180, 181, 192, 194, 205, 904; 159/47.3; 422/184.1, 227, 906; 423/130, 364; 588/210, 219, 227, 237

(56) References Cited

U.S. PATENT DOCUMENTS

| 3,051,639 | 8/1962 | Anderson ................... 204/171 |
| 3,841,239 | * 10/1974 | Nakamura et al. ........... 110/8 C |
| 4,265,747 | * 5/1981 | Copa et al. .................. 210/758 |
| 4,438,706 | 3/1984 | Boday et al. ................ 110/238 |
| 4,509,434 | 4/1985 | Boday et al. ................ 110/238 |
| 4,761,793 | 8/1988 | Digne et al. ................. 373/24 |
| 4,801,435 | * 1/1989 | Tylko ......................... 422/906 |

(List continued on next page.)

FOREIGN PATENT DOCUMENTS

| 44 40 813 A1 | 5/1995 | (DE) . |
| 0 354 731 A1 | 2/1990 | (EP) . |
| 0 469 737 A2 | 2/1992 | (EP) . |
| WO 91/13292 | 9/1991 | (WO) . |

OTHER PUBLICATIONS

"Destruction of Cyanides in Spent Potlining Leachate", by V.K. Kasireddy, J.L. Bernier, G. Soucy and L. Fortin, dated Aug. 26, 1996.

* cited by examiner

Primary Examiner—Peter A. Hruskoci
(74) Attorney, Agent, or Firm—Cooper & Dunham LLP

(57) ABSTRACT

The invention relates to a reactor for the treatment of wastewater solutions containing cyanide and other dissolved organic material, having an elongated tube having an entrance (28) and an exit (32), and an energy source (22) for the tube, preferably positioned adjacent the exit. The energy source generates intense energy such that a cyanide/organic material-containing solution can be treated by passing it through the tube to expose it to said energy so that the solution absorbs sufficient energy from the energy source to degrade the cyanide and/or dissolved organic material contained therein. The source of intense energy is preferably a plasma, e.g. a plasma generated by a plasma torch or a DC electric arc. The invention also relates to a process of treatment of such a wastewater solution by passing it through such a reactor.

23 Claims, 11 Drawing Sheets

U.S. PATENT DOCUMENTS

| | | | |
|---|---|---|---|
| 4,948,485 | 8/1990 | Wallsten et al. | 204/164 |
| 4,980,092 | 12/1990 | Pineau et al. | 252/632 |
| 4,989,522 | 2/1991 | Cline et al. | 110/250 |
| 5,073,193 * | 12/1991 | Chaklader et al. | 75/346 |
| 5,131,941 | 7/1992 | Lemelson | 75/10.19 |
| 5,160,637 | 11/1992 | Bell et al. | 210/766 |
| 5,206,879 | 4/1993 | Moody et al. | 373/22 |
| 5,222,448 * | 6/1993 | Morgenthaler et al. | 110/346 |
| 5,280,757 * | 1/1994 | Carter et al. | 110/346 |
| 5,363,781 | 11/1994 | Chang et al. | 110/250 |
| 5,420,391 | 5/1995 | Delcea | 219/121.47 |
| 5,443,572 * | 8/1995 | Wilkinson et al. | 266/46 |
| 5,470,559 | 11/1995 | Grolman et al. | 423/489 |
| 5,555,822 * | 9/1996 | Loewen et al. | 110/237 |
| 5,571,486 * | 11/1996 | Robert et al. | 422/184.1 |
| 5,629,464 * | 5/1997 | Bsach et al. | 585/634 |
| 5,993,761 * | 11/1999 | Czernichowski et al. | 423/210 |

THERMAL PLASMA REACTOR AND WASTEWATER TREATMENT METHOD

CROSS-REFERENCE TO RELATED APPLICATION

This application is a continuation-in-part of U.S. patent application Ser. No. 08/575,630, filed Dec. 20, 1995 now abandoned.

TECHNICAL FIELD

This invention relates to thermal reactor systems. More particularly, the invention relates to thermal reactor systems employing one or more preferably submerged energy sources, and to processes for treating wastewater using such thermal reactor systems.

BACKGROUND ART

Treatment of industrial wastewater streams presents numerous difficult challenges, including efficient and effective degradation of dissolved compounds or ions and/or organic materials, with minimum investment, and with minimum interference with industrial efficiency and output. In other words, the treatments which are often mandated by government statute or regulation need to make effective use of energy, manpower, capital and other resources, while returning wastewater to be disposed of or recycled containing acceptable amounts of contaminants.

U.S. Pat. No. 5,470,559, issued Nov. 28, 1995 (Grolman et al.), assigned to the same assignee as the present application, discloses a method and apparatus for recycling used linings of aluminum reduction cells, more commonly called spent potlinings (SPL). The potlinings, composed primarily of carbon, refractory brick, and cryolite, include fluorine, alumina and sodium, along with free and complexed cyanides. The process involves grinding the spent potlining material to a powder, and treating the powder with aqueous sodium hydroxide to produce a slurry. The slurry is separated into solids and liquid; the liquid is then diluted (if necessary) to produce a solution containing the cyanide or complexed cyanide ions suitable for cyanide destruction and sodium fluoride crystallization.

U.S. Pat. No. 5,160,637, issued Nov. 3, 1992 (Bell et al.), also assigned to the same assignee as the present application, discloses a method and apparatus for treatment and degradation of cyanides and ferrocyanides contained in wastewater resulting from the conversion of alumina into aluminum metal. The patent discloses a vertical tubular reactor in which the wastewater is treated under heat and pressure. In some applications, cyanide and ferrocyanide ions can be effectively degraded using high pressures and temperatures as disclosed in that patent. The equipment necessary to carry out the process, however, is quite expensive to purchase and install, and uses considerable amounts of energy to produce the temperatures and pressures useful therein. Accordingly, a less expensive system for accomplishing that goal would be desirable.

European patent application 469 737 A2 published on Feb. 5, 1992 in the name of Tioxide Group Services Limited discloses a destruction process in which chemical waste is burned in oxygen using an electric plasma flame to heat a stream of gas which contains at least 70% by weight oxygen. Liquid waste in fine droplet form is introduced into the gas stream via a two-fluid atomiser.

U.S. Pat. No. 3,051,639, which issued on Aug. 28, 1962 and was assigned to Union Carbide Corporation, discloses a process and apparatus for carrying out chemical reactions, particularly the conversion of liquid or gaseous hydrocarbons into acetylene. The process involves creating a stream of hot arc gas from a wall-stabilized electric arc and injecting a gaseous or liquid hydrocarbon is injected into the stream, or the stream is directed into a relatively large volume of liquid hydrocarbon.

U.S. Pat. No. 4,438,706, which issued on Mar. 27, 1984 and was assigned to Villamosipari Kutato Intezet, discloses a procedure and equipment for destroying fluid waste containing vaporizable organic materia by a plasma technique. The procedure involves producing a plasma, creating a plasma torch at one end of a reactor, introducing the waste in vapour form and oxygen into the torch for interaction with the reactor and discharging end products from the reactor. The reactor is a double-walled tube, the inner wall being perforated to allow the passage of air into the reaction zone.

German patent DE 44 40 813 A1, which was published on May 18, 1995 and was assigned to Fraunhofer-Gesellschaft zur Förderung der angewandten Forschng e.V., discloses a method for the treatment of liquids, including liquids containing cyanide. The liquid is held in a discharge zone between two opposed electrodes supplied with alternating current. Micro discharge filaments are formed in the discharge zone extending from the liquid surface to the opposing electrode. The method destroys hazardous matter in the waste water and converts it into harmless compounds.

DISCLOSURE OF THE INVENTION

It is therefore an object of the present invention to provide an improved thermal reactor capable of treating wastewater and other fluids.

More particularly, it is an object of the invention to provide an improved reactor system suitable for treating wastewater containing spent potlining leachate including cyanide and cyanide complexes such as ferrocyanides, and other undesired impurities.

It is a further object to provide a thermal reactor system suitable for treating wastewater such as spent Bayer process liquor, which heats the wastewater to evaporate and concentrate the liquid, causing precipitation of compositions dissolved therein, and degradation of organic materials contained therein.

The foregoing disadvantages of the prior art are overcome and the objects are achieved by providing an improved thermal reactor comprising an elongated tube having a liquid inlet and outlet. Intense energy is generated in the tube from a suitable source, preferably adjacent to the inlet of the elongated tube, so that the liquid flows past the source and absorbs energy therefrom. The intense energy is preferably a plasma (a mixture of electrons, ions and neutral particles), e.g. a thermal plasma having temperatures in excess of 4000° C. generated by an arc struck between electrodes or by induction. A direct current (DC) plasma torch has proven to be preferable operating at a power range of up to 2 MW and at an efficiency of up to 90% at atmospheric pressure.

While the energy should be generated within the reactor tube for direct contact with the wastewater, the energy source or generator (e.g. a plasma torch) may itself be positioned partially or fully outside the reactor tube, provided it directs the energy into the tube. The energy source is preferably submerged in the wastewater solution.

The elongated reactor tube may be, for example, a draft tube, an eductor tube or a venturi tube. The following are the definitions of the terms "draft", "eductor" and "venturi" tubes as used herein:

Draft Tube:

In a draft tube, the energy of the jet is transferred to the liquid and forces the liquid away from the jet. Here the primary high velocity gas of the jet enters at a position at the axis of the tube, and in mixing with the secondary low velocity fluid imparts an initial momentum. However, in an embodiment of this invention, the hot plasma gas increases in volume and transfers most of its thermal energy to the entrained secondary phase. The primary upward force in the draft tube is provided by the difference in density between the hot mixture of liquid and gas in the draft tube and the cooler liquid outside the tube. This difference depends on the volume fraction occupied by the gas in the liquid/gas mixture that is primarily determined by the local temperature and secondly by the plasma gas mass flow. The secondary fluid thus receives the momentum to carry it to the opposite end of the tube and causes fresh liquid to be drawn into the opposite end of the draft tube.

Eductor Tube:

An eductor tube is similar to a draft tube, except that there are additional openings located in the walls of the tube. The jet causes the liquid inside the tube to be carried to the far end, and the volume so generated is filled by liquid drawn in through the openings in the wall as well as by the liquid drawn in through the open end of the tube.

Venturi Tube:

A venturi tube is a tube with a restriction located between the two openings. The restriction can be created by narrowing the diameter in the middle portion, which results in the two ends being flared away from the middle. The venturi or restriction in the tube causes a change in pressure of the liquid carried along the tube, promoting further mixing and facilitating the entry of fresh liquid at the other end of the tube.

The reactor tube may itself be provided within a larger container or shell and submerged below the surface of the liquid in the shell, so that liquid may circulate between the resvervoir within the shell and the interior of the reactor tube.

In one embodiment of the present invention, the elongated tube is a draft tube reactor, and the radiant energy source is a submerged plasma torch located vertically near the fluid inlet to the draft tube. The draft tube may also preferably have head space of larger diameter than the part of the draft reactor tube in which the contact between the liquid and the energy takes place (or the reactor shell containing the reactor tube may provide such enlarged head space) itself in order to allow for dissipation of gasses and reduction of turbulence. In a further embodiment, the radiant energy source is an electric arc.

The invention also provides a process for treating wastewater or other liquid, such as spent potlining leachate, by passing the wastewater through an elongated tube having a source of intense energy, such as a plasma torch or electric arc, positioned therein. As the waste water passes through the elongated tube adjacent to the plasma torch or electric arc, the plasma torch or electric arc directly heats and radiates the solution and destroys many of the contaminants. The exact destruction method is unknown. However, without wishing to be bound to any particular theory, it is believed that it may involve ultraviolet radiation, reaction with radicals formed through radiation, thermally provoked hydrolysis, oxidation, or other mechanisms. Further, the thermal source causes the solution to partially evaporate, which in turn may cause precipitation of other dissolved compounds, such as sodium fluoride and sodium hydroxide.

BEST MODES FOR CARRYING OUT THE INVENTION

Figure 1:
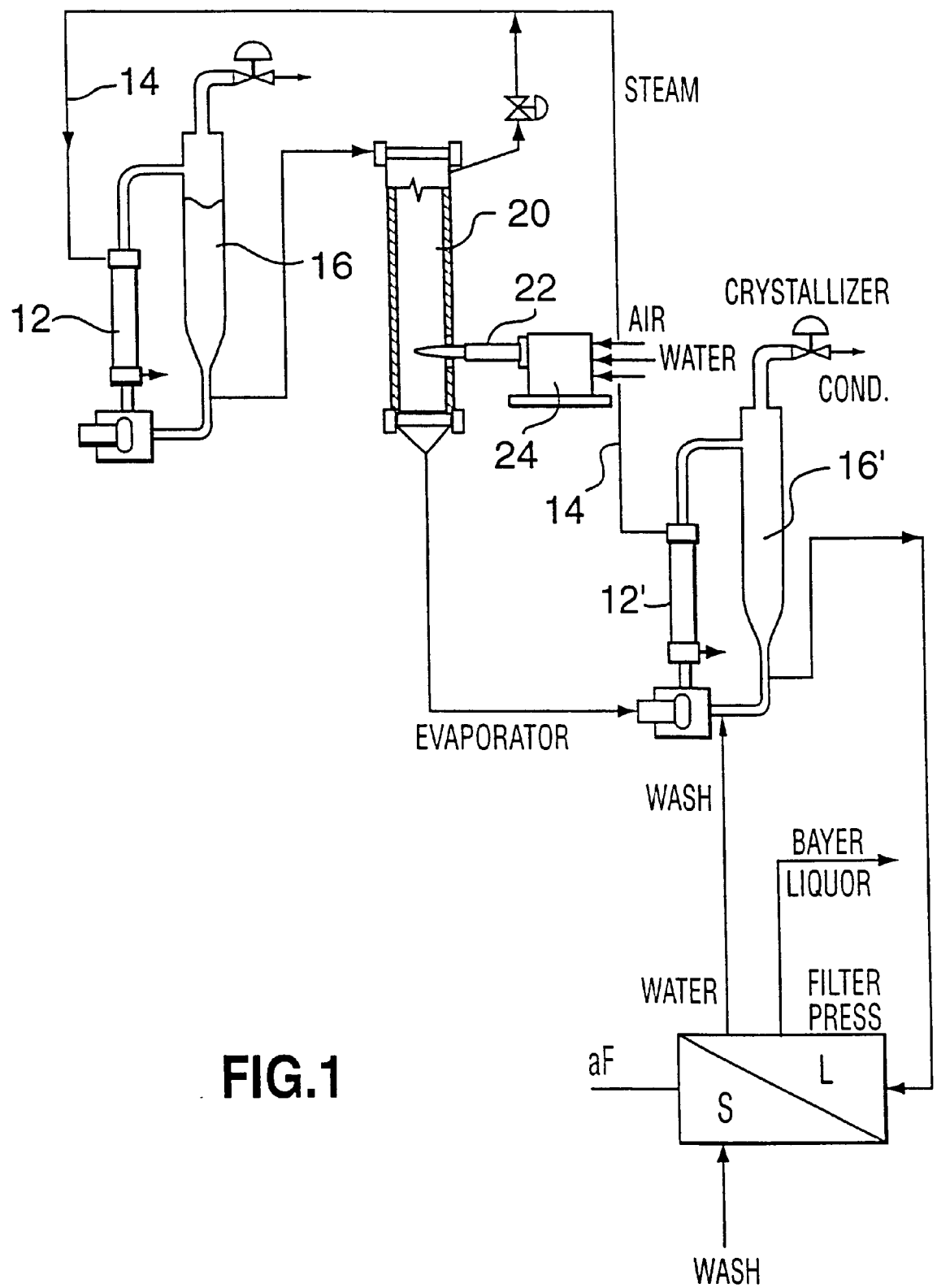
FIG. 1 is a schematic drawing of one embodiment of an apparatus for carrying out the process of the present invention shown as part of a system for treating spend potlining leachate.

In conventional processes for heating solutions, submerged heating elements are often used. Unfortunately, the deposition of solid materials precipitated from the solution by the heat causes loss in efficiency of heat transfer and increases in the cost of operation because of the required periodic cleaning. Direct heating by injecting steam is an option in some applications, but the accompanying dilution of the liquid thus heated and the difficulty in supplying steam at very high pressures (i.e. up to 250° C. at pressures up to 2,068.5 kPa [300 psig]) are serious limitations. However, the process of the present invention solves such problems by providing intense energy acting directly on, and preferably submerged within, the wastewater itself, e.g. a plasma radiation source, such as a plasma torch or an electric arc. However, it should be noted that the purpose of the plasma radiation is not just to provide a different way of heating the waste water solution, but also of treating the solution with ultraviolet radiation (causing oxidation), alkaline hydrolysis and oxidation in the presence of reactive chemical species (catalysts), which have in turn been created by the intense energy. These reactive species can by themselves help to destroy the undesirable contaminants which are present.

This method has direct application in the aluminum industry, among other industries, to achieve:

1. Destruction of cyanides (e.g. from the treatment of spent potlinings) in the form of free cyanides (CN) or complex cyanides (Fe(CN)) in order to reduce their concentrations from 600–1000 ppm to less than 1 ppm; and
2. Destruction of organic materials (e.g. from the Bayer process) present in the form of oxalates, humic acids and other organic compounds.

In the second case, the treatment is capable of bringing about a decrease in organic matter from an initial concentration of 8–10 g/l to about 5 g/l, a concentration often desirable in Bayer processes, or even down to less than 1 g/l.

The treatment involves direct (or at least close) contact between an intense radiation source, e.g. a stationary DC thermal plasma torch or an electric arc, and a flowing liquor. Once again, without wishing to be bound by a particular theory, it is believed that the desired chemical transformations appear to result from two principal mechanisms. The first is simply rapid heating of the liquor under high pressure (up to possibly 2,068.5 kPa [300 psig]) at temperatures up to 250° C. in the presence of an oxidizing or reducing atmosphere, if required. Under these conditions, the surface of the plasma-water interface has a direct impact on the mechanisms of the transfer of mass and of energy because of the large thermal gradients which are present. The second mechanism is a photochemical effect. Because the radiation emitted by a plasma increases considerably with the pressure at which it operates, it will be possible to expose the liquor during its short residence time in the reactor to intense ultraviolet radiation and a high temperature gradient, which increase considerably the rate of destruction of the contaminants in the reactor. The latter permits destabilization of oxalates and the destruction of other organic species even at atmospheric pressure, which is not feasible in conventional methods. It is also possible to add reactive species like ozone, hydrogen peroxide or other catalysts, such as titanium dioxide, to enhance the rate of destabilization or decomposition.

The present invention provides a method and apparatus for treating aqueous waste solutions, such as spent Bayer liquor or cyanide-containing liquids using energy at sub-atmospheric, atmospheric, or super-atmospheric pressures. The plasma radiation source is preferably a submerged thermal DC plasma, but a submerged DC arc is also suitable, for providing intense heat and ultraviolet light with a minimum of plasma gas. The radiation source (or sources) is preferably placed in (or placed to project energy into) an elongated tube such as a draft tube, venturi, or eductor, to permit entry of the solution to be treated, exposure to the plasma and finally exit of the treated solution. In this way, the temperature of the bulk of the solutions (surrounding the tube in a reactor shell or the like) is different from the temperature at the interface of the radiation source and the solution. Further, the diameter of the upper part of the reactor tube (or of the reactor shell) is preferably larger than the bottom of the reactor, to provide a marked difference in velocity of the upward flow of liquid, thereby promoting the separation of entrained gases from the liquid. In addition, the space in the upper larger diameter portion of the reactor tube (or shell) contains both the liquid, and a free space above the surface of the liquid for collecting the previously entrained gases. The purpose of the draft tube, venturi or eductor is to control the rate of liquid flow past the plasma and thus the residence time of the liquid in the plasma zone. In this way, the rate of energy transfer from the plasma to the liquid can be regulated.

The optimal rate of flow of the liquid past the plasma radiation source will vary from case to case and depends on such factors as the nature of the solution to be treated, the operating parameters of the plasma (plasma gas, plasma power, plasma surface characteristics, operating pressure and temperature) and the hydrodynamic behaviour of the solution in the reactor. A definite range of suitable rates cannot therefore be provided, but suitable rates of flow can be found in each particular case simply by varying the rates of flow (e.g. by using reaction tubes of varying diameter) and determining the concentration of remaining contaminants. The optimal rate of flow will reduce the contaminants to a desired level for a given plasma source.

As mentioned above, an important aspect of the invention is to surround the plasma produced by a suitable source, e.g. the plasma torch or the DC arc, with a tube. The plasma source itself may be within the tube, or partially or fully outside, provided the energy is directed into the tube, e.g. as a jet of hot plasma gases emitted by the plasma torch. The plasma is a hot ionized gas which radiates both heat and ultraviolet energy and is preferably produced in the form of a jet from a plasma torch. On leaving the outlet of the plasma torch, the jet will entrain the surrounding fluid and expand. Moreover, vapour is produced on exposure of the liquid to the heat of the source. The momentum of the jet is transferred to the surrounding fluid being entrained. There is some loss in the momentum due to turbulence, but these effects are minimized when the jet is surrounded by a tube. A suitable plasma torch for use in commercial scale processes is obtainable from Westinghouse Electric Corporation, Pittsburgh, Pa., USA. The plasma torch provides no heated surface in contact with the solution where scaling could occur. It heats the solution without dilution (such as from superheated steam), introducing carbon dioxide (such as from a submerged flame), or providing a hot surface, where scaling could occur (such as from direct or indirect resistance heating).

The plasma torch and the tube are preferably oriented vertically, with the plasma torch positioned at the bottom of a reactor adjacent to the entrance of the tube. If desired, however, the torch and surrounding tube may be horizontal or at any angle between horizontal and vertical, as illustrated schematically in FIG. 7. There may be a single torch, or a plurality of torches, located at different positions in the reactor, but all preferably below the surface of the liquid. The reactor may be configured for batch operation, but may also be operated continuously, with a steady flow of liquor in at the bottom, and a steady flow of treated liquor out from the upper layers. The dimensions of the reactor and the torches may be varied in accordance with the volume of wastewater for processing, the type of contaminants dissolved therein, and space constraints for the reactor.

Figure 2:
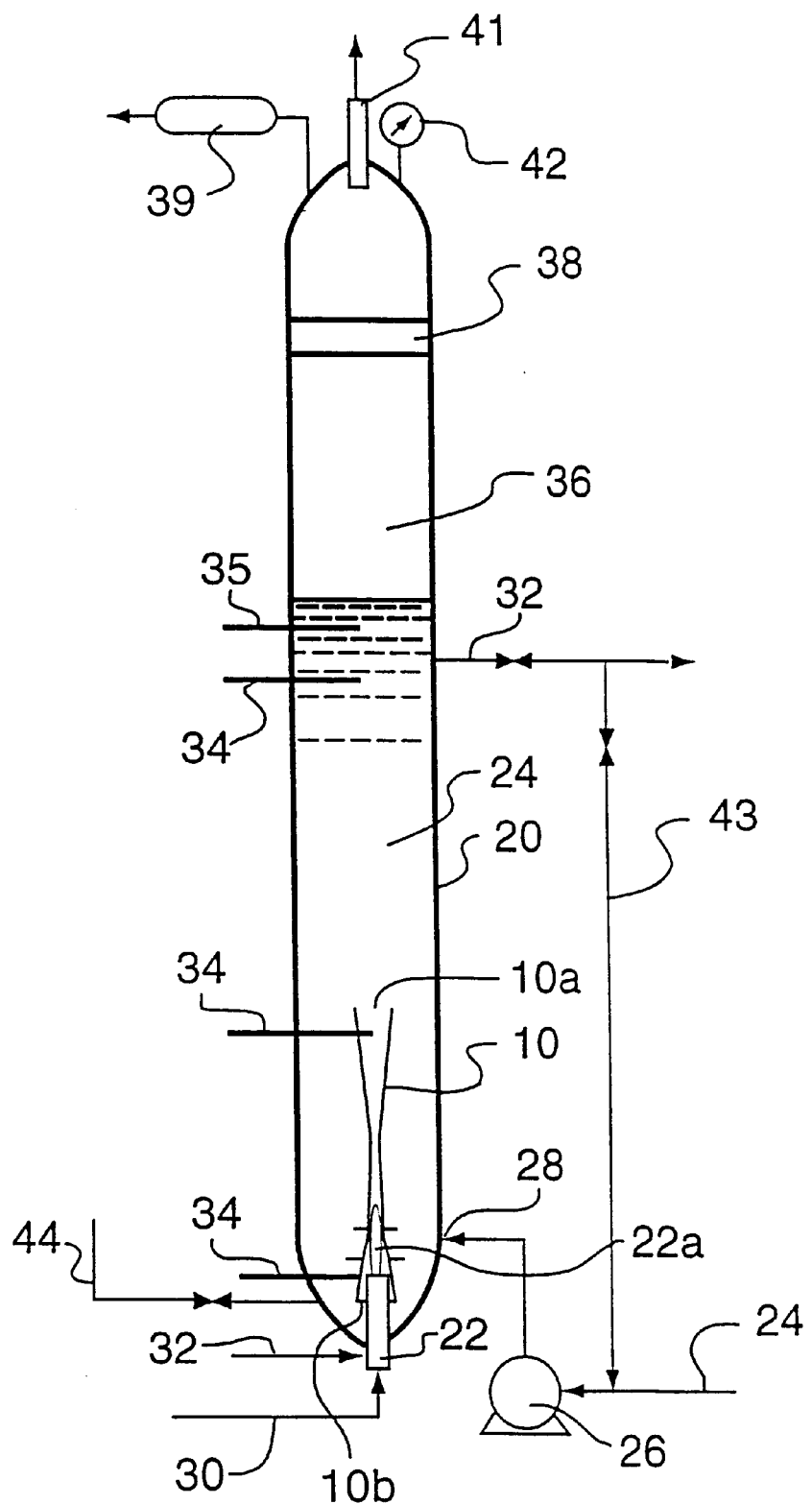
FIG. 2 is a schematic drawing of a cross-section of a thermal reactor suitable for use in the system of FIG. 1, including a plasma torch for carrying out the present invention.
Figure 7:
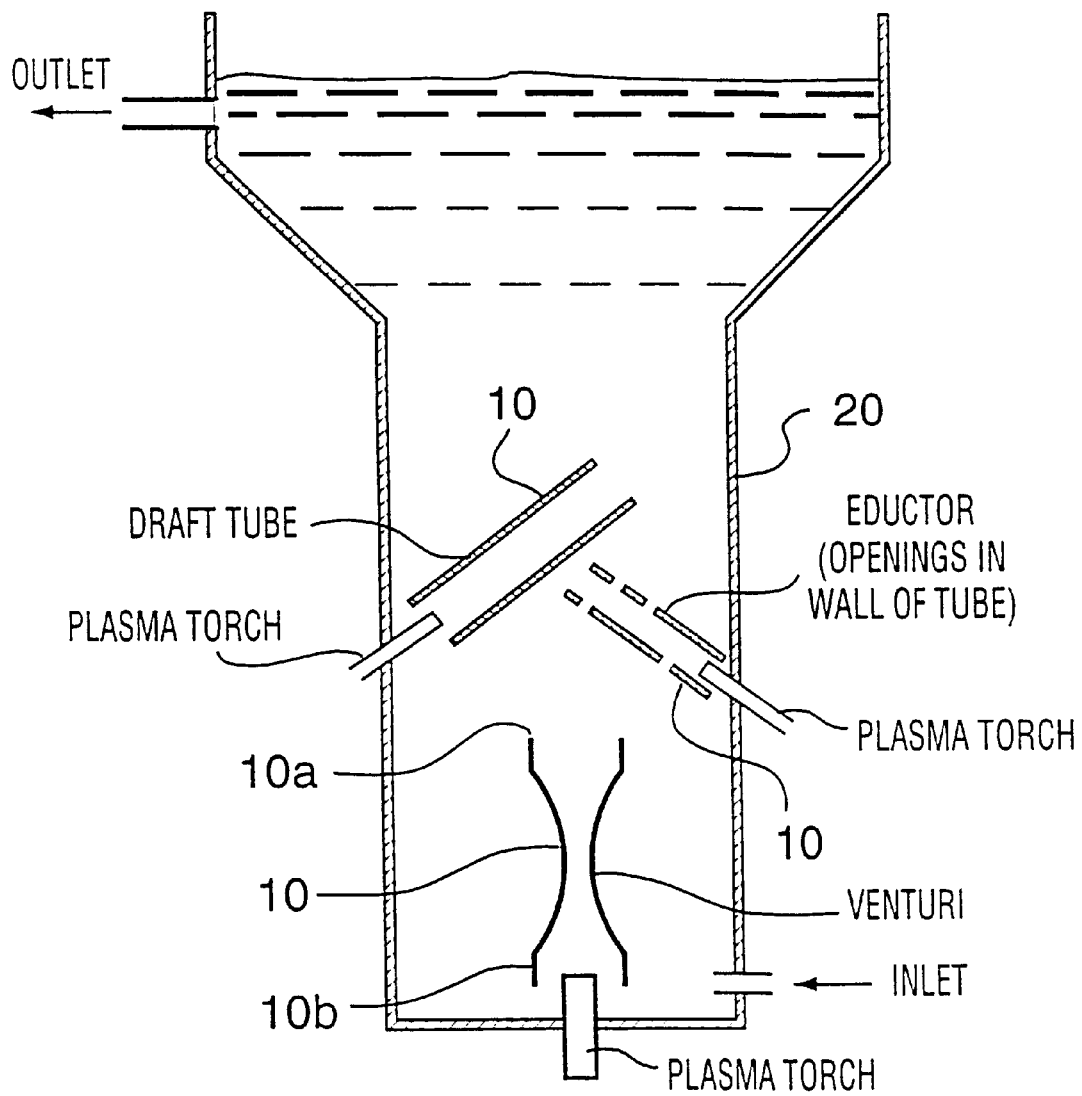
FIG. 7 is a further cross-sectional schematic drawing of the present invention showing possible alternative placements of the draft tube, eductor, venturi and plasma torch.

The process and apparatus for carrying out the present invention can be understood with reference to FIG. 1, which is a schematic diagram of the plasma treatment portion of a spent potlining treatment process and apparatus (e.g as disclosed in U.S. Pat. No. 5,470,559). The liquid remaining after filtration of solids, such as carbon, from spent potlining leachate treatment is pumped into an evaporator 12 to which steam 14 is added. Remaining precipitable solids are removed in a crystallizer 16 and the liquid is forwarded to a draft tube reactor 20 which has a plasma torch 22 located at the lower portion thereof. The plasma torch, operated by a power supply 24, is fed with a source or argon or other carrier gas such as nitrogen. The plasma torch emits high temperature and pressure plasma which transfers heat, momentum and ultraviolet energy to the liquid passing by in the draft tube as shown in FIGS. 3(A), 3(B) 6 and 7, or using an eductor (e.g. as shown in FIG. 7) or a venturi (as shown in FIGS. 2 and 7). The heat and ultraviolet energy help break down cyanides and cyanide-complexes (or organic materials) contained in the liquid, while the heat helps evaporate the liquid so that dissolved compounds such as sodium fluoride may be precipitated therefrom, although dimensions can be varied depending on the specific application.

After treatment in the draft tube reactor 20, the liquid is passed through a second evaporator 12' fed with steam 14, and then to a second crystalliser 16' to remove remaining precipitable solids. The remaining liquid is then fed subjected to further conventional treatment.

It has been found that the reactor's cyanide-destroying capability is independent of the caustic concentration in the leachate, and therefore several possibilities exist regarding the concentration of the liquid before or after the treatment in the reactor. For example, it is possible to:

1. Provide evaporator/crystalliser units 12,16 on both sides of the reactor, as shown in FIG. 1;
2. Provide an evaporator/crystalliser unit 12,16 on the upstream side of the reactor only;
3. Provide an evaporator/crystallizer unit 12,16 on the downstream side of the reactor only; or
4. Provide no evaporator/crystalliser units whatsoever, relying on the reactor itself to concentrate the liquid.

An advantage of arrangement 2. is that the reactor may be made smaller in size since it handles a reduced volume of liquid. The advantage of arrangement 4. is that the number of separate operations may be reduced and the overall process simplified.

A preferred structure of the plasma reactor is shown in FIG. 2. Leachate feed 24 enters pump 26 and is fed into reactor 20 at inlet 28. It passes plasma torch 22 which is fed with a source of plasma gas 30. The plasma gas may be argon, argon/nitrogen mixtures, argon/other gas mixtures, or air. Cooling water 32 helps maintain acceptable operating temperatures for the plasma torch 22. The plasma torch 22 generates a plasma jet 22a within a tube 10 (in this case a venturi tube) The plasma jet is submerged within the leachate 24 in the tube 10 and acts directly on the leachate to reduce concentrations of cyanide or organics that may be present. The leachate rises through the tube 10 and exits the outlet 10a at the top, and is replaced by fresh untreated leachate entering the entrance 10a of the tube at the bottom. A plurality of thermocouples 34 mounted in the reactor vessel 20 helps monitor temperature therein. Once the leachate 24 passes the plasma torch 22 and exits the outlet 10a, it continues to rise through the reactor 20 until it exits at valve 32. A level gauge 35 monitors the liquid level inside the reactor 20. An important feature of the reactor is the head space 36 or expansion space provided above the liquid level to allow entrained gases to escape, thereby reducing foam. The gases pass through a mist separator 38 and escape through a valve 39. The reactor is protected by a pressure relief pop-up valve 41 and the pressure can be monitored by a pressure gauge 42.

If desired, some or all of the treated leachate may be recycled via line 43 to the pump 26. A drain 44 is provided for maintenance and repair purposes.

Figures 3A, 3B:
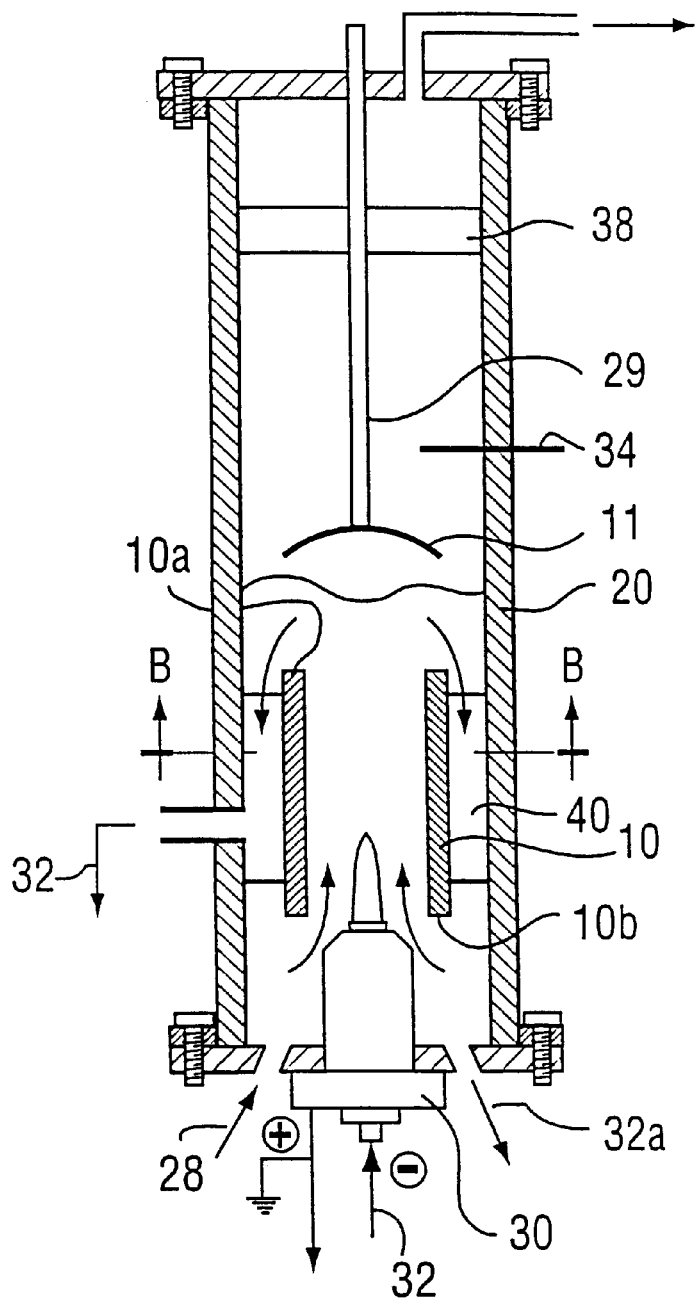
FIG. 3(A) is a schematic drawing in cross-section of a draft tube apparatus illustrating placement of baffles in the draft tube of the reactor.
FIG. 3(B) is a horizontal cross-section of the apparatus of FIG. 3(A) taken on the line B—B of FIG. 3(A)

FIGS. 3(A) and 3(B) illustrate the placement of support baffles 40 within draft tube 20, when use of a draft tube is desired. As mentioned above, the placement of an eductor or venturi may be used instead of a draft tube, as shown in FIG. 7, and the placement of the draft tube, venturi or eductor may be varied in accordance with the type of liquid being treated and other parameters known to those of ordinary skill in the art until desired placement may be determined by experimentation.

The apparatus shown in FIGS. 3(A) and 3(B) is a little different from the reactor of FIG. 2 in that the treated leachate is removed from outlet 32, but may also be removed from outlet 32a positioned at the bottom of the reactor 20. The reactor also has an adjustable deflector 11 for suppressing surges of liquid or foam. Apparatus of this type may have a solution volume of 5.3 L, a net volume of 3.0 L, a mass flow of 1.5 L/min and a residence time of 2 minutes.

The following Experimental Section and Examples are intended to be illustrative and representative of the practice of the invention, and not to be construed as limiting the scope of the invention in any manner.

EXPERIMENTAL SECTION

Two major configurations of the reactor were studied in water before beginning the work with the wastewater solutions. The plasma torch used in the work was a DC (Direct Current) non-transferred thermal plasma torch operating at between 10 and 19 kilowatts, with either a tungsten-lined or copper anode.

EXAMPLE 1

An important consideration in treating the solutions is to obtain a large surface area of solution for exposure to the heat and the radiation generated by the torch. The first attempts were with a film reactor, in which water was made to flow over, and adhere to the interior surface of the reactor, with the plasma torch mounted axially in the reactor.

Figure 4:
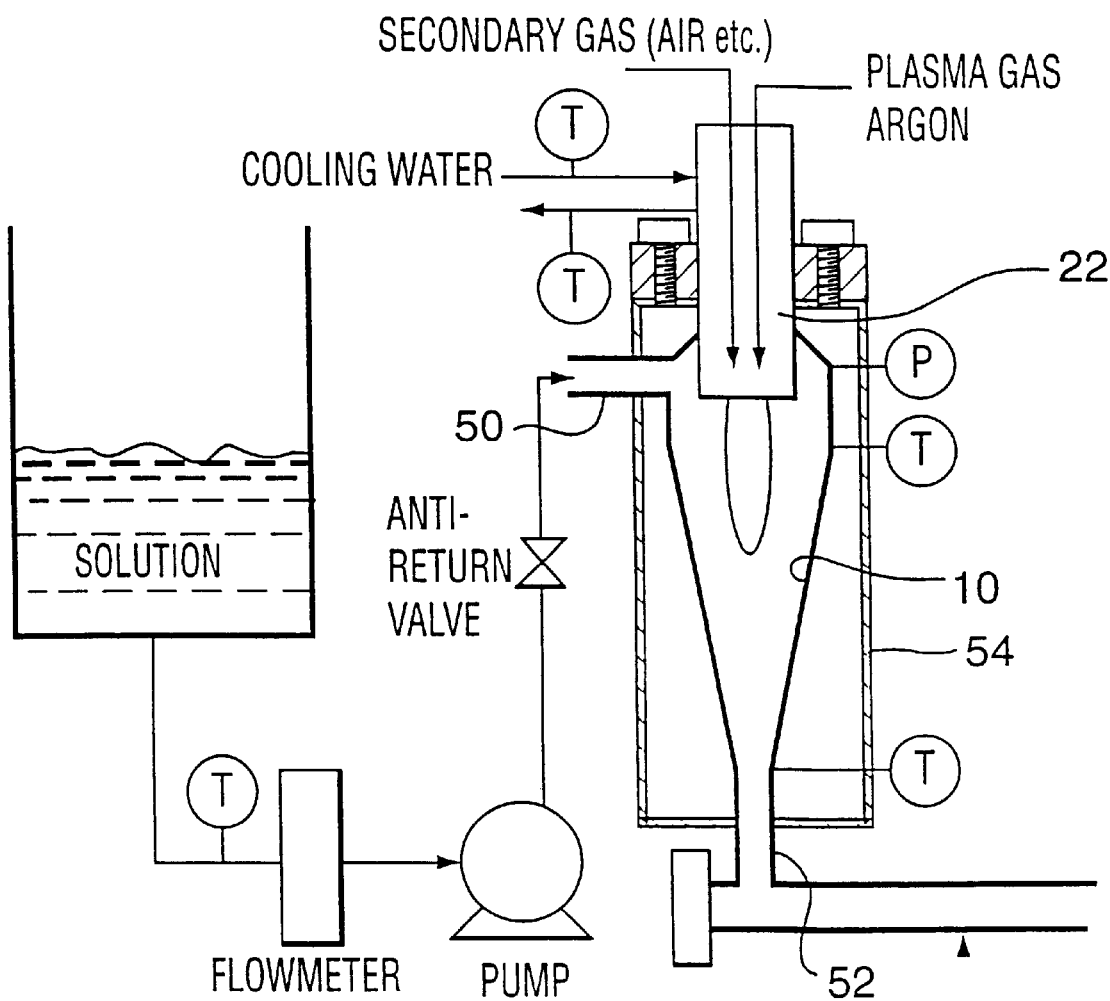
FIG. 4 is a schematic drawing in cross-section of a film reactor used in the trial discussed in Example 1.

The design of the first reactor is shown in FIG. 4. In this embodiment, the reactor tube 10 is vertical and the plasma torch 22 is directed downwardly into the reactor tube from the top. In this case, there is no surrounding reactor shell, and instead liquid is introduced into the reactor tube via a tangential inlet 50 and the treated liquid and vapours leave via a central lower outlet 52. The reactor tube narrows from top to bottom and this, coupled with the tangential introduction of the liquid, tends to produce a swirling motion that helps to keep the walls of the reactor tube cool and promotes a rapid treatment reaction. The reactor tube is surrounded by a cooling jacket 54 that again helps to dissipate heat. The equipment as shown included a plasma reactor which could operate at high pressures (2,068.5 kPa [300 psig]) in which the continuous (Direct Current) plasma torch was located axially. The torch was cooled by water and fed with two gas flows. The plasma gas was essentially argon. As noted, high pressure water was made to enter the reactor tangentially thereby forming a film of water which surrounded the plasma torch. As a result, the water was heated rapidly and exposed to the intense ultraviolet radiation. The reactor, which had a conical bottom, forced the mixture of injected water, and the resultant steam produced according to the pressures used, and the plasma gases to pass through an expansion valve in which the pressure of the mixture falls rapidly from 2,068.5 kPa [300 psig] to atmospheric.

Before operating the plasma torch, a hydrodynamic study at atmospheric pressure was made of the film reactor in order to see the behavior of the film. The results showed that a flow rate of 1 litre/minute of water was insufficient to create a film of water over the entire surface of the reactor. It was possible to obtain a continuous film by increasing the flow rate of the liquid.

Modifications were therefore carried out to increase the speed of the entering water by decreasing the diameter of the feed tube. A flow of approximately 2.5 L/min. was required to obtain a continuous film. At a lower flow rate, the film formed and then disappeared before a steady state could be realized. In fact, to secure at least 5 minutes of operation with a complete film over the entire surface flow rates of 1.5, 2.0, and 2.25 L/min. were required, but these flow rates did not provide sufficient residence time for the liquid inside the reactor.

EXAMPLE 2

Figure 5A:
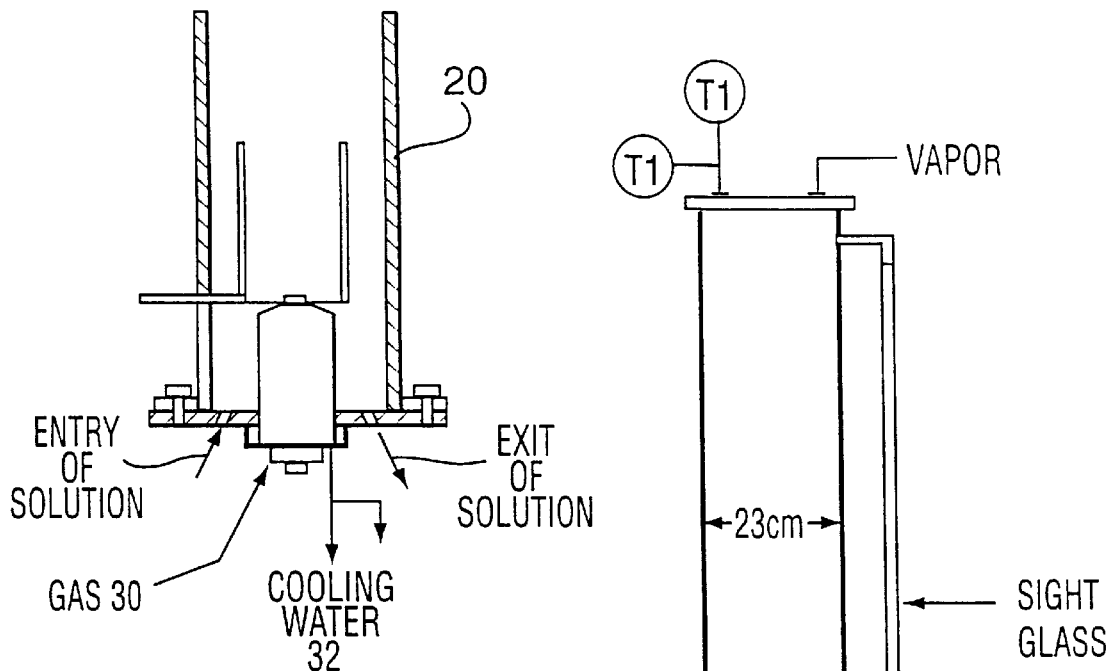
FIGS. 5(A) and 5(B) are cross-sectional schematic drawings of reactors for use in the present invention showing alternative diameters for the draft tube.
Figure 5B:
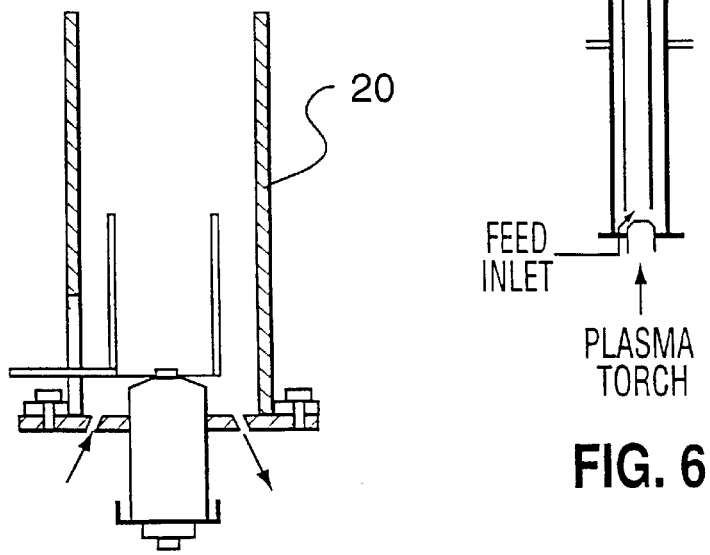
Figure 6:
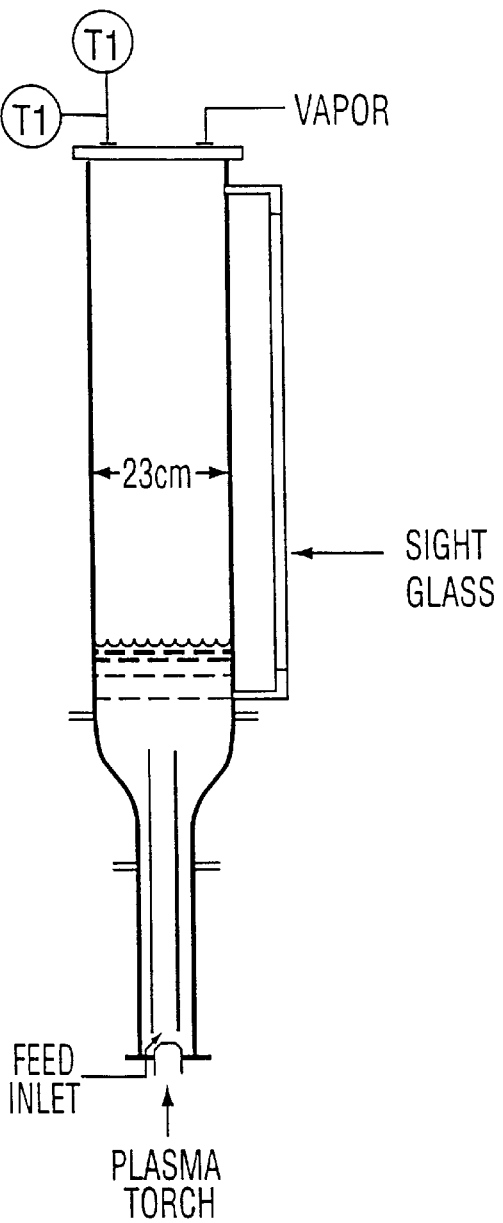
FIG. 6 is a further cross-sectional schematic drawing of a draft tube reactor having an expanded upper section for use in the present invention.

The next reactor tested provided a high degree of recirculation of the solution inside the reactor. The characteristics of this reactor are shown in FIGS. 5a and 5b. The plasma torch was placed in the bottom of the reactor, where, during operation, it is covered by the liquid inside the reactor, and thus is called a "submerged" plasma torch. An open ended tube was placed at the position of the plasma gases exiting from the torch when it is in operation. This tube provided a channel for the recirculation of the liquid around the outside of the tube and allowed a constant flow of liquid to flow through the inside of the tube and be exposed to the plasma gases. In addition, the feed into the reactor is made at four locations instead of at one. The plasma torch was operated with argon at 10 kW power. The plasma torch was started in many trials in the empty reactor, and once in operation, the reactor was filled and the torch operated in the "submerged" mode. The torch was also started in the submerged mode.

The best results were obtained with a draft tube 5 cm [2 inches] in diameter (as shown in FIG. 5(B)) which provided for a more uniform flow of the liquid through the interior of the tube and gave better recirculation. The height of the draft tube was 30 cm (12 inches), so as to increase the contact time between the gas and the liquid. The reactor shell 20 consisted of a tube 10 cm [4 inches] interior diameter and about 1.5 m [5 feet] high. This gave a good mixing of the liquid and the gas.

EXAMPLE 3

The foregoing configuration of the plasma reactor produced considerable amounts of foam. This hindered the recirculation of the liquid through the reactor. The reactor was therefore modified to permit the separation of the plasma gases from the liquid in an expansion space above the upper surface of the liquid. This was done by increasing the diameter of the upper part of the reactor, to provide for an abrupt decrease in the velocity of the upwardly flowing liquid, and to give an expansion space above the upper surface of the liquid in which to collect the plasma gas. The design of this reactor is shown schematically in FIG. 6. This reactor gave a much improved separation of the gas from the liquid, and considerably decreased the amount of gas recirculated with the liquid through the draft tube.

EXAMPLE OF RESULTS OBTAINED

The reactor was operated with:

different plasma gases, Ar and Ar plus $N_2$;

power inputs, at 10 and 19 kW;

volumes of liquid, at 5.1 and 14.1 L;

concentrations of sodium hydroxide, at 32 and 57 g/l; and concentrations of cyanide, initially at 139 and 356 ppm.

Figure 8:
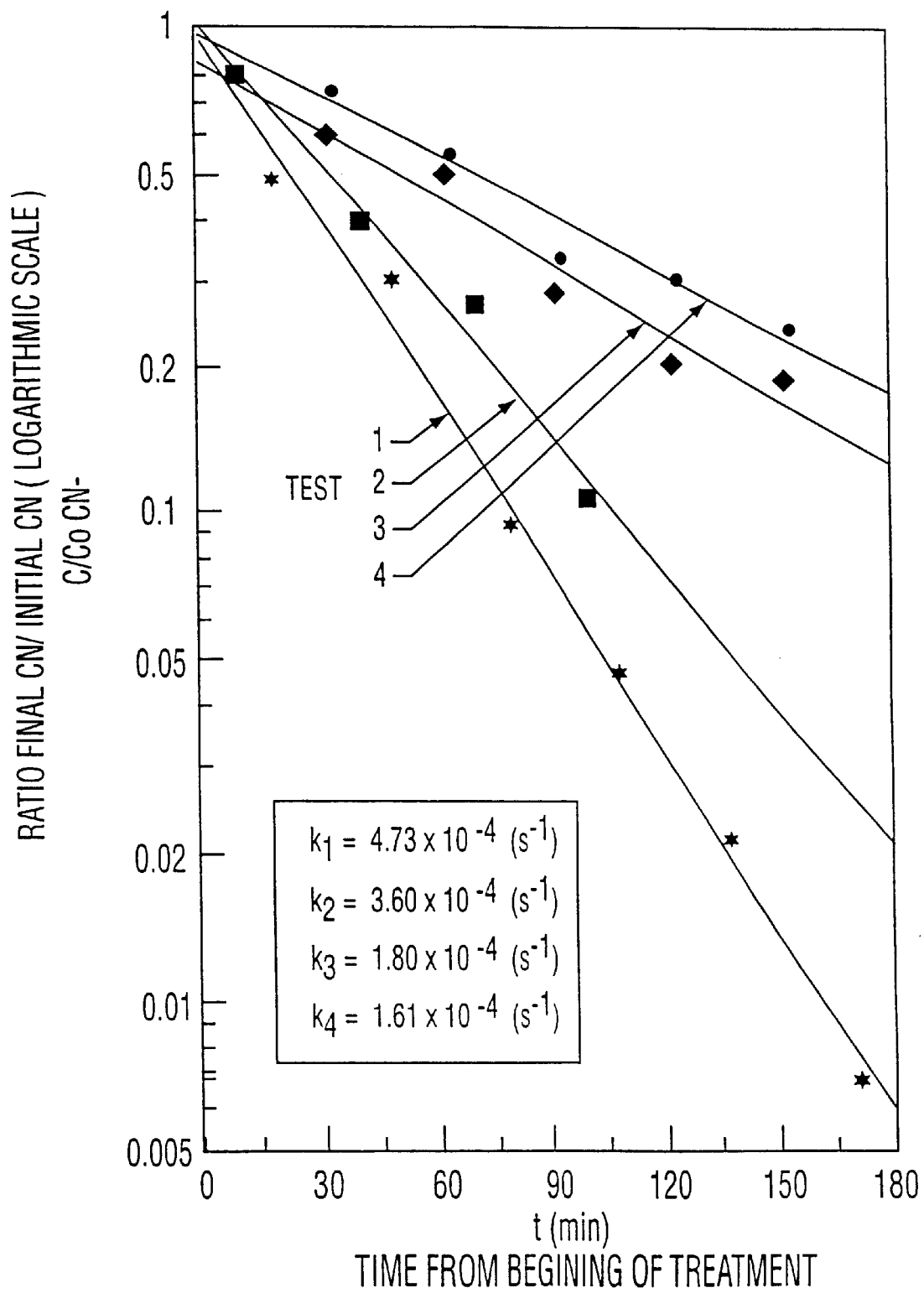
FIG. 8 is a graphical representation of the ratio of the final to the initial cyanide concentration plotted on a logarithmic scale versus time after reaching the treatment temperature (the reaction constants (K) for the various tests are shown on the graph)

The operating conditions are summarized in Table 1, and the rate of destruction of the cyanide is shown in FIG. 8 expressed as the logarithm of the ratio of final concentration (C) divided by the initial concentration (Co).

These results show that the destruction of cyanide was effective under all conditions. The reactor operated satisfactorily with argon as plasma gas; and also with a mixture or argon and nitrogen. Copper can replace the tungsten as the anode in the plasma torch, if desired.

TABLE 1

OPERATING CONDITIONS

| TEST | REACTOR | PLASMA GASES | POWER kW | ANODE | VOL of SOL'N L | START CONC'N CN ppm | CONC'N NaOH g/l |
|---|---|---|---|---|---|---|---|
| 1 | NO EXPANSION | Ar @ 25 L/min | 10 | W | 5.1 | 139 | 32 |
| 2 | WITH EXPANSION | Ar @ 25 L/min | 10 | W | 14.7 | 296 | 32 |
| 3 | WITH EXPANSION | Ar @ 25 L/min | 10 | W | 14.9 | 35 | 57 |
| 4 | WITH EXPANSION | Ar @ 12.5 L/min plus $N_2$ @ 14.2 L/min | 10 | Cu | 14.1 | 356 | 32 |

EXAMPLE 4

Figure 9:
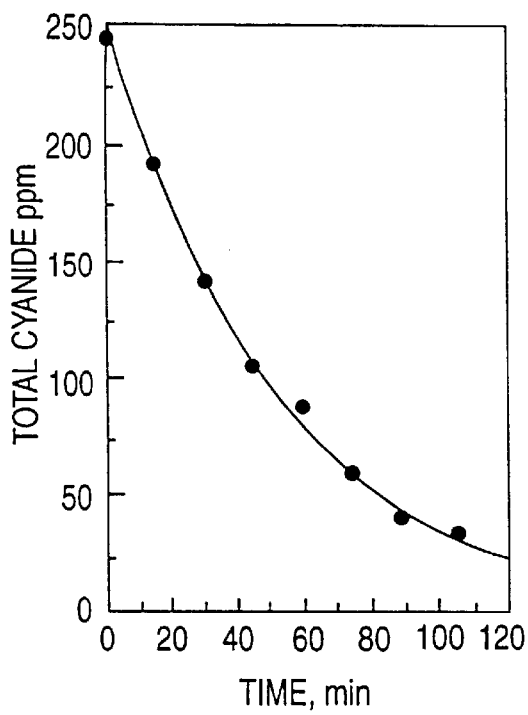
FIGS. 9(A) and 9(B) are graphs showing total cyanide concentration as a function of treatment time, and the logarithm-ln(C/Co) versus time, as explained in Example 4.
Figure 9:
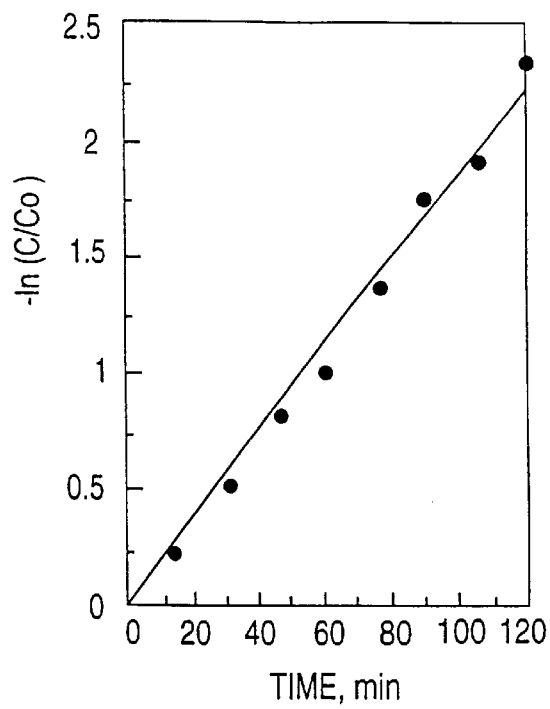

A typical result for the treatment of spent potlining leachate in a plasma reactor is shown in FIGS. 9(A) and 9(B). The total cyanide concentration as a function of treatment time is shown in FIG. 9(A). A graph of $-\ln(C/Co)$ versus time is shown in FIG. 9(B). In the latter, the exponential results show a first order reaction regarding the cyanide decomposition. A first order reaction rate was also observed. In the conventional treatment of spent potlining to reduce cyanide contents, the lining leachate is treated with caustic alkali, e.g. sodium hydroxide, and the degree of destruction of cyanide is directly dependent on the concentration of alkali. A test was carried out to see if the destruction of cyanide from spent potlinings using the process of the invention also depends on the concentration of alkali.

The effect of temperature on cyanide destruction was established by comparing the efficiency of alkaline hydrolysis in a batch reactor and a plasma reactor. The batch reactor was a 2 litre Parr reactor, model 4542. For all experiments, a similar spent potlining leachate was used in both reactors. The rate constant for cyanide decomposition obtained by both methods are presented in Table 2.

TABLE 2

Cyanide Decomposition Rate Constant (k) in Parr Reactor (thermal hydrolysis) and in a Plasma Reactor (Thermal hydrolysis & Plasma Effect)

| Temperature (° C.) | Parr Reactor 1000 × k (s$^{-1}$) | Plasma Reactor 1000 × k (s$^{-1}$) |
| --- | --- | --- |
| 100.00 | 0.04 | 0.48 |
| 170.00 | 1.90 | 3.10 |
| 180.00 | 2.90 | 4.30 |

In a semi-batch mode, the rate constant in the plasma reactor was found to be 1.5 to 1.7 times higher than thermal hydrolysis in a Parr reactor at ideal operating conditions. In a plasma reactor, the cyanide is decomposed by thermal hydrolysis and the plasma effect. In terms of percentage ratio, thermal over plasma constriction ratio at 100, 170 and 180° C., is 9:91, 58:42 and 67:33, respectively. This improvement is thee result of high thermal gradients at the plasma liquid interface and UV radiation. All these results were obtained without changing the caustic concentration. The destruction of cyanides by thermal plasma was achieved at atmospheric pressure, which as previously considered not feasible by conventional thermal hydrolysis.

Experiments were conducted at atmospheric pressure to determine the effect of caustic concentration on the kinetics of cyanide decomposition. From FIGS. 10(A) and 10(B), it appears that the cyanide destruction rate is not affected by the caustic concentration at 100° C. On the contrary, in thermal hydrolysis at a temperature of 180° C., caustic concentration had a significant influence on the destruction rate as shown earlier. It can be concluded that caustic concentration from 32 to 57 g/l NaOH, does not significantly change the rate of destruction of cyanides in a plasma reactor. The optimum concentration of 60 g/l for thermal hydrolysis was not observed in the plasma reactor under these conditions.

Figure 10:
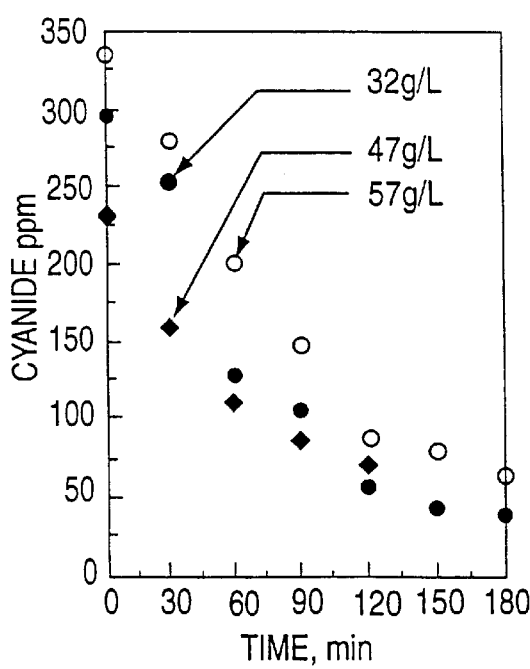
FIGS. 10(A) and 10(B) are graphs showing the destruction of cyanide, and the logarithm-ln(C/Co), respectively, versus time, as explained in Example 4.
Figure 10:
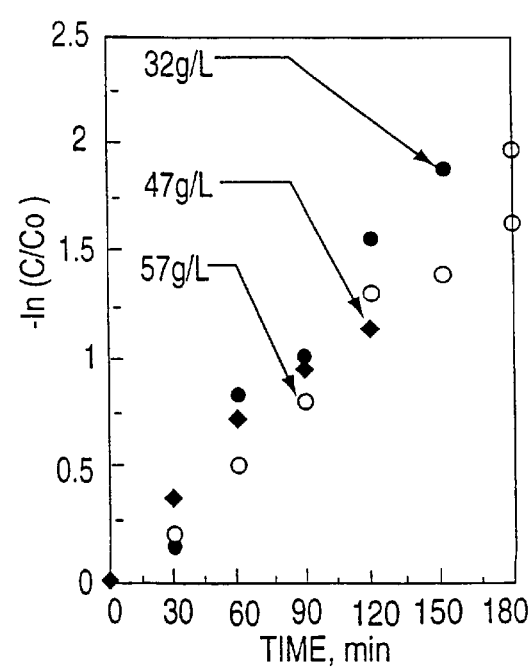

In FIG. 10(B), C is the total cyanide concentration at time "t", and Co is the initial total cyanide concentration.

Figure 11:
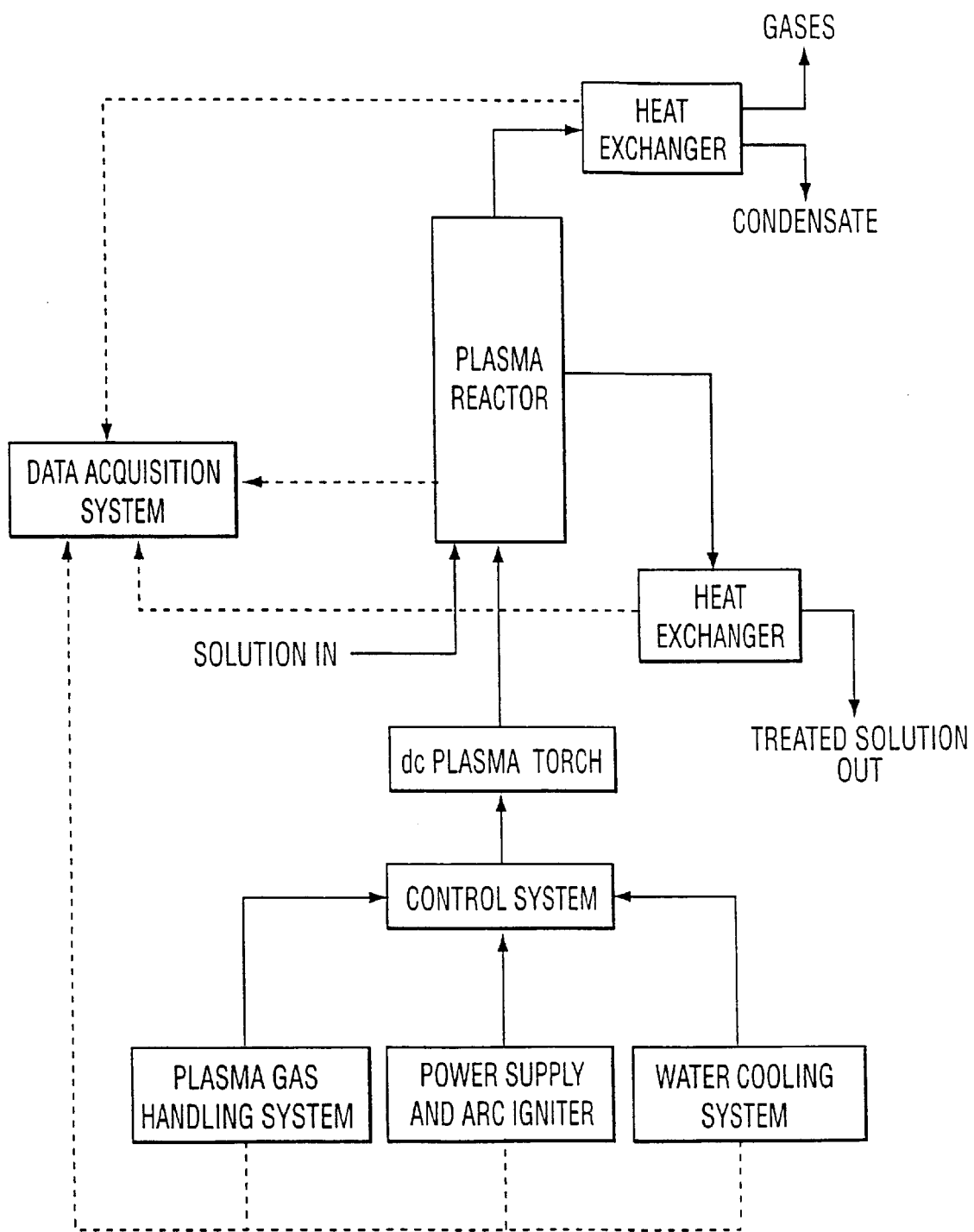
FIG. 11 is a block diagram showing a system used in Examples 5 and 6.
Figure 12:
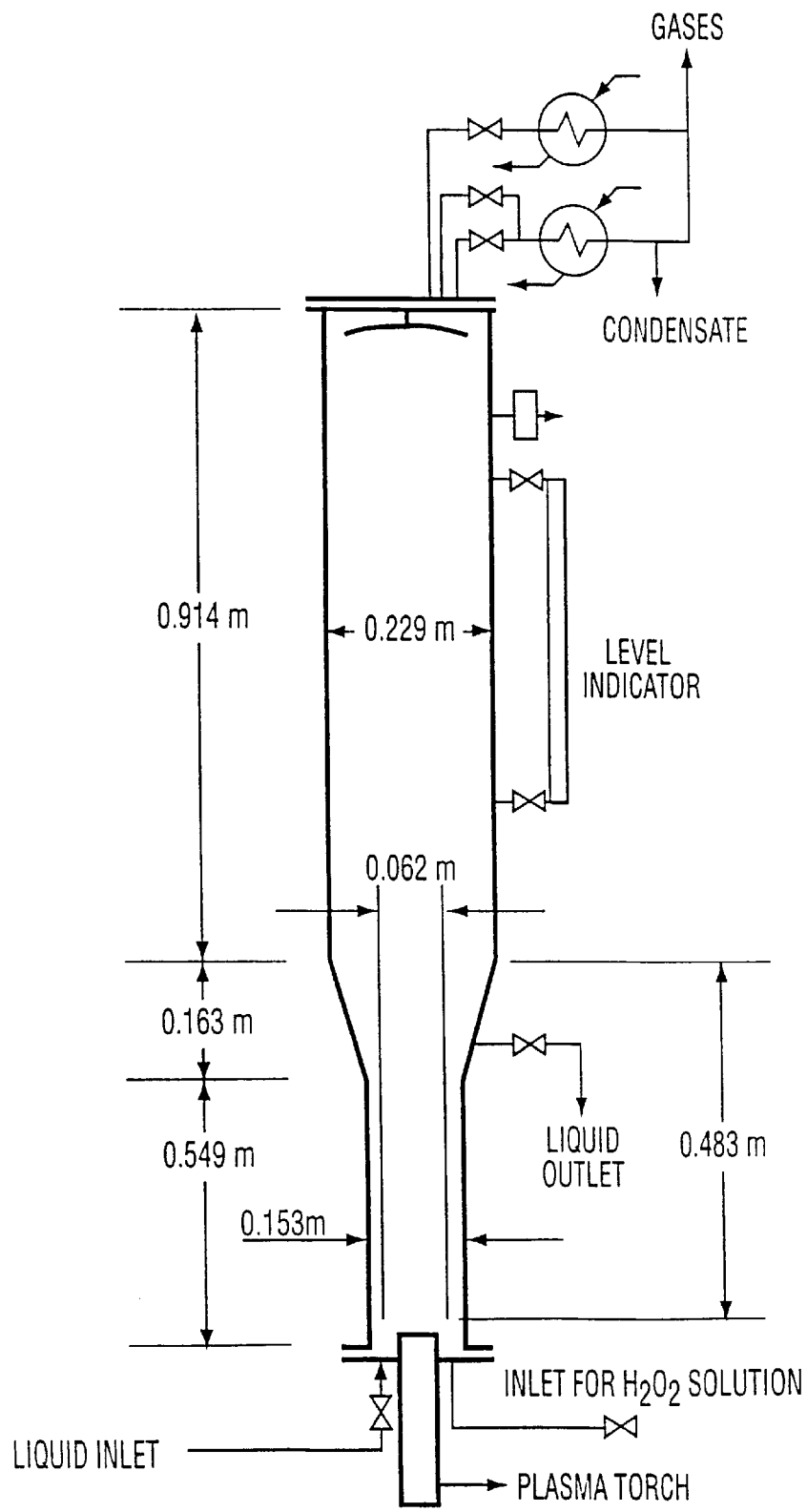
FIG. 12 is a cross-section of a reactor according to the present invention as used in Examples 5 and 6.

For the following Examples 5 and 6, the apparatus shown in FIGS. 11 and 12 was used.

The block diagram of the experimental setup used to produce these results is given in FIG. 11. The setup is believed to be self-explanatory in view of the labels provided in the figure for the various elements. The design and dimensions of the plasma reactor are shown in FIG. 12.

The DC plasma torch was supplied by Westinghouse Electric Corporation, Pittsburgh, USA of model Mark 3A. This torch is rated at 50 to 200 kW power and can be operated on compressed air, oxygen, nitrogen, argon, etc. The torch was operated in submerged mode. That is, the head of the plasma torch was completely immersed in the liquid in the reactor. Design modifications were made to the plasma torch to allow for submerged and high pressure operation. The torch was ignited in submerged mode, and the liquid in the reactor circulates around the plasma plume. There was direct heat transfer between the plasma and the liquid. The UV radiation emitted from plasma was absorbed by the surrounding liquid. The experimental setup was designed to operate in batch and continuous mode.

The plasma torch was operated on compressed air. This is the most economical way for operating the torch. The oxygen in the air has a significant influence on oxidation of organics and cyanides, in the presence of UV radiation. The electrode life is significantly longer with air, than with argon or nitrogen. The rate of heat transfer from the plasma to the liquid is also faster.

EXAMPLE 5

Destruction of Organics and Destabilization of Oxalates in Spent Bayer Liquor

Spent Bayer liquor was used for this Example. This is the liquor left over after the precipitation of supersaturated alumina, also referred to as digestion, which is the first step in the Bayer process for the extraction of alumina from bauxite. This liquor is normally recycled back to the digestion step to reclaim the caustic and dissolved alumina that are still present. The organics not only tend to discolour the alumina that is produced in the digestion process, but their presence also tends to slow down the process itself, making it less cost effective.

Eighteen (18) litres of the spent Bayer liquor was treated by dc thermal plasma operating at 100 kW, using compressed air as the plasma gas. The reactor was maintained at 160° C. and 6.8 atm. (690 kPa).

Figure 13:
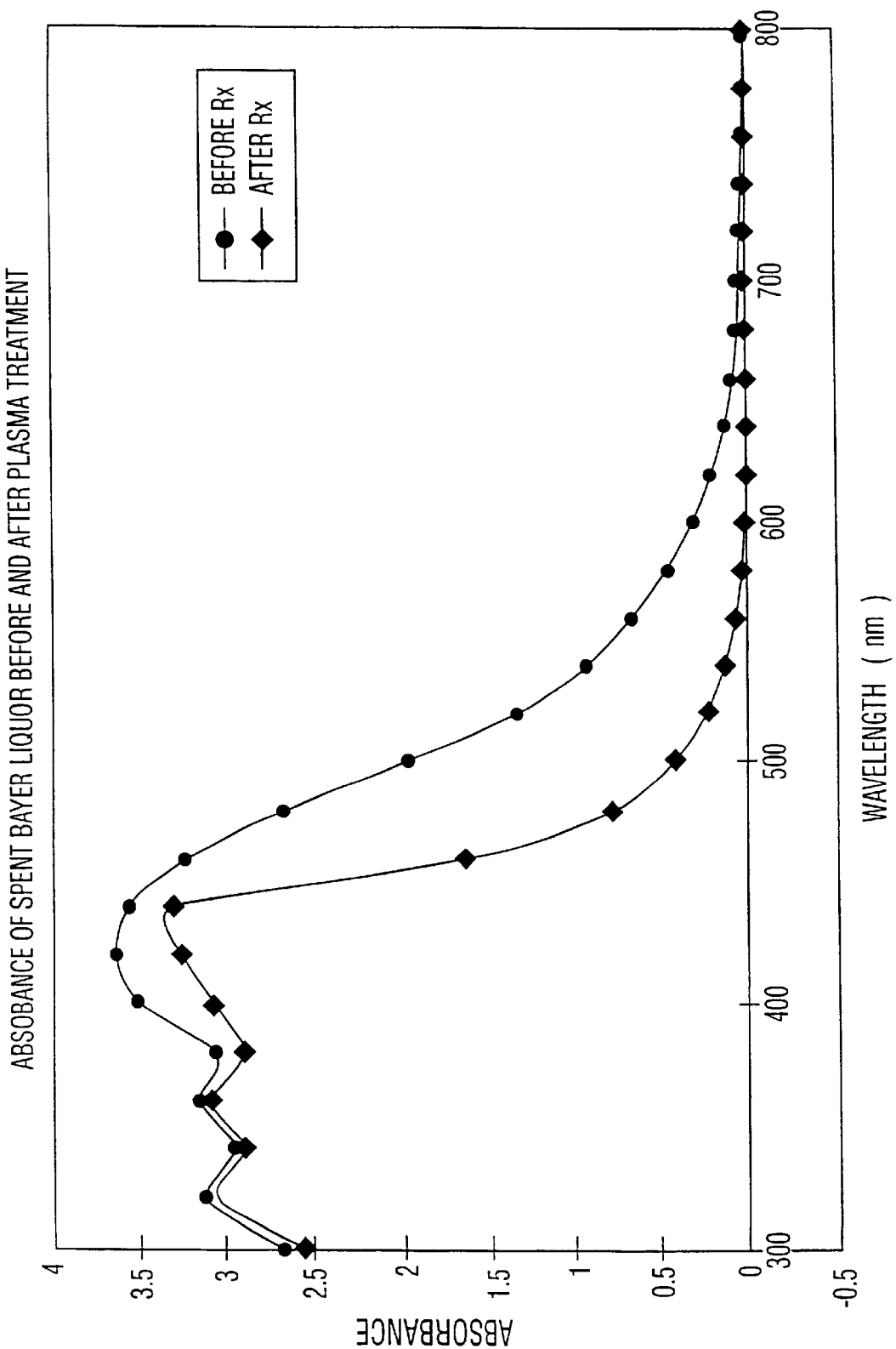
FIG. 13 is a graph showing light absorbence of spent Bayer liquor before and after treatment according to the process of the present invention.

The total organic carbon (TOC) decreased from 7.4 g/l to 5.9 g/l after plasma treatment for just 10 minutes. The carbonate ($CO_3$) concentration increased from 22.6 g/l to 28.1 g/l, indicating the oxidation of organics. The critical oxalate concentration (COC) test proved that the oxalates were destabilized. Foaming was considerably reduced in the treated solution. The colour of the spent Bayer liquor changed from opaque dark brown to clear orange. The graph of FIG. 13 shows the comparison of light absorbence of various wavelengths in the liquor before and after the plasma treatment. A benefit of the lighter colour is that a better grade of aluminium oxide (super white hydrate) results from the Bayer process.

EXAMPLE 6

Decomposition of Cyanides in Spent Potlining (SPL) Leachate (A) 19 litres of spend pot lining (SPL) leachate was treated by dc thermal plasma using compressed air at 60 kW. The reactor was maintained at atmospheric pressure and 101° C. The concentration of total cyanides decreased from 369 ppm to 136 ppm in 8 minutes after plasma treatment.

(B) 20 litres of SPL leachate was treated by dc thermal plasma using compressed air at 95 kW. The operating conditions were 161° C. and 6.9 atm (703 kPa) in the reactor. 120 ml of 30% solution of hydrogen peroxide was added to enhance the decomposition of cyanides. The total cyanide concentration decreased from 468 ppm to 36 ppm in 12 minutes.

What is claimed is:

1. A reactor for the treatment of wastewater solutions containing cyanide and/or dissolved organic material, comprising a container for holding a reservoir of wastewater solution having an entrance and an exit, and a plasma torch for directing a jet of plasma energy into the container from an outlet provided in the torch, characterized in that said reactor includes an open-ended tube positioned within said container such that said open-ended tube is submerged, in use, within said reservoir of wastewater solution, the plasma torch being positioned adjacent to an entrance of the open-ended tube, so that said jet of plasma energy from said torch is directed into said open-ended tube, said plasma torch and said entrance of said open-ended tube defining a gap allowing wastewater solution to enter said open-ended tube through said entrance, and thereby enabling recirculation of wastewater from said container through the inside of said open-ended tube, wherein said container comprises head space above the wastewater solution to promote separation of entrained gases from the wastewater solution.

2. The reactor of claim 1, characterized in that said plasma torch is positioned adjacent to said entrance of said container.

3. The reactor of claim 1, characterized in that the open-ended tube is a draft tube, an eductor tube, or a venturi tube.

4. The reactor of claim 1, characterized in that said container is tubular and the diameter of the tubular container adjacent to the exit is larger than the diameter of the tubular container adjacent to the entrance of the tubular container.

5. The reactor of claim 1, characterized in that said container is tubular and the diameter of the tubular container adjacent to the exit is substantially the same as the diameter adjacent to the entrance of the tubular container.

6. The reactor of claim 1, characterized in that the container includes a space wherein gas may collect adjacent to the exit.

7. The reactor of claim 1, characterized in that the plasma jet transfers momentum to the liquid in the open-ended tube.

8. The reactor of claim 1, characterized in that the plasma torch and the open-ended tube are both oriented substantially vertically.

9. The reactor of claim 1, characterized in that a plurality of plasma torches are provided for the container.

10. A process of destroying cyanide and/or dissolved organic material contaminants in an aqueous wastewater solution containing said contaminants, which comprises directing a jet of plasma energy into a container provided with an entrance and an exit for said wastewater solution while passing wastewater solution through said container, said plasma energy being sufficient to destroy said contaminants, characterized in that the plasma torch is started and operated while submerged within and contacted by a reservoir of wastewater solution held within said container, wherein said container comprises head space above the wastewater solution to promote separation of entrained gases from the wastewater solution.

11. A process of destroying cyanide and/or dissolved organic material contaminants in an aqueous wastewater solution containing said contaminants, which comprises directing a jet of plasma energy from a plasma torch into a container containing a reservoir of wastewater solution, said plasma energy being sufficient to destroy said contaminants, characterized in that an elongated open-ended tube is positioned within said reservoir in said container and said jet of plasma energy is directed into said open-ended tube from a position adjacent to an entrance of said open-ended tube, and in that said plasma torch is positioned relative to said entrance of said open-ended tube to define therewith a gap allowing wastewater solution to enter said open-ended tube through said entrance, and thereby enabling recirculation of wastewater from said container through the inside of said open-ended tube.

12. A process in accordance with claim 10 or claim 11, characterized in that the container is tubular and increases in diameter from the entrance of the container to the exit, and liquid flows upward in the tubular container past the plasma torch and exits the tubular container at a higher velocity than it has upon entering the tubular container.

13. A process in accordance with claim 12, characterized in that the liquid passing through the tube gains momentum from the plasma emitted by the plasma torch.

14. A process in accordance with claim 10 or claim 11, characterized in that the container is tubular and has a diameter adjacent to the entrance of the container that is substantially the same as the diameter adjacent to the exit, and liquid flows upward in the tubular container past the plasma torch and exits the tubular container at a higher velocity than it has upon entering the tubular container.

15. A process in accordance with claim 11, characterized in that the plasma torch and the elongated open-ended tube are both oriented substantially vertically and the liquid is caused to travel through the open-ended tube in a substantially vertical direction.

16. A process in accordance with claim 10 or claim 11, characterized in that the aqueous wastewater solution has cyanide ions contained therein.

17. A process in accordance with claim 10 or claim 11, characterized in that the aqueous wastewater solution has metal salts dissolved therein and wherein said process comprises evaporating water from the solution in said container.

18. A process according to claim 10 or claim 11, characterized in that said solution is concentrated and precipitate is allowed to crystallize therefrom before being passed through said container.

19. A process according to claim 10 or claim 11, characterized in that said solution is concentrated and precipitate is allowed to crystallize therefrom after being passed through said container.

20. A process according to claim 10 or claim 11, characterized in that said solution is concentrated and precipitate is allowed to crystallize therefrom both before and after being passed through said container.

21. A process according to claim 10 or claim 11, characterized in that said solution passed through said container is a cyanide-containing solution obtained from the treatment of potlinings.

22. A process according to claim 10 or claim 11, characterized in that said solution passed through said container is a solution containing dissolved organic materials obtained from operation of the Bayer process.

23. A process according to claim 22, characterized in that said solution is concentrated and a superwhite alumina hydrate is allowed to crystallize therefrom after being passed through said tube.

* * * * *